(12) United States Patent
Li (10) Patent No.: US 11,500,147 B2
(45) Date of Patent: Nov. 15, 2022

(54) BACKLIGHT SOURCE MODULE AND DISPLAY DEVICE (71) Applicants: BOE OPTICAL SCIENCE AND TECHNOLOGY CO., LTD., Jiangsu (CN); BOE TECHNOLOGY GROUP CO., LTD., Beijing (CN)

(72) Inventor: Wenjun Li, Beijing (CN)

(73) Assignees: BOE OPTICAL SCIENCE AND TECHNOLOGY CO., LTD., Jiangsu (CN); BOE TECHNOLOGY GROUP CO., LTD., Beijing (CN)

( * ) Notice: Subject to any disclaimer, the term of this patent is extended or adjusted under 35 U.S.C. 154(b) by 460 days.

(21) Appl. No.: 16/610,997

(22) PCT Filed: Apr. 25, 2019

(86) PCT No.: PCT/CN2019/084348
§ 371 (c)(1),
(2) Date: Nov. 5, 2019

(87) PCT Pub. No.: WO2019/214451
PCT Pub. Date: Nov. 14, 2019

(65) Prior Publication Data
US 2021/0364689 A1    Nov. 25, 2021

(30) Foreign Application Priority Data

May 9, 2018  (CN) .................... 201820689511.2

(51) Int. Cl.
*F21V 8/00*     (2006.01)

(52) U.S. Cl.
CPC .......... *G02B 6/0085* (2013.01); *G02B 6/009* (2013.01); *G02B 6/0055* (2013.01); *G02B 6/0083* (2013.01); *G02B 6/0088* (2013.01)

(58) Field of Classification Search
CPC .. G02B 6/0085; G02B 6/0055; G02B 6/0083; G02B 6/0088
USPC ......................................................... 362/615
See application file for complete search history.

(56) References Cited

U.S. PATENT DOCUMENTS

| 7,213,960 | B2 * | 5/2007 | Yoo ..................... G02B 6/0068 362/613 |
| 9,322,982 | B2 | 4/2016 | Yu |
| 10,180,535 | B1 | 1/2019 | Zeng et al. |
| 10,437,088 | B2 | 10/2019 | Zeng |

(Continued)

FOREIGN PATENT DOCUMENTS

| CN | 2685923 Y | 3/2005 |
| CN | 1779520 A | 5/2006 |

(Continued)

*Primary Examiner* — Bryon T Gyllstrom (57) ABSTRACT

A backlight source module and a display device are provided. The backlight source module includes a back plate structure and a rubber member. The back plate structure includes a bottom plate, and a first side plate and a second side plate respectively connected with the bottom plate, and the first side plate and the second side plate oppose each other. A light-emitting portion, a light-guiding component and the rubber member are sequentially disposed on the bottom plate along a first direction pointing from the first side plate to the second side plate. The rubber member is only disposed at the second side plate.

20 Claims, 3 Drawing Sheets

(56) References Cited

U.S. PATENT DOCUMENTS

| | | | | |
|---|---|---|---|---|
| 2008/0297695 A1* | 12/2008 | Sekiguchi | ............ | G02B 6/0078 |
| | | | | 349/65 |
| 2011/0277361 A1* | 11/2011 | Nichol | ................. | G02B 6/0028 |
| | | | | 40/541 |
| 2012/0087151 A1* | 4/2012 | Hamada | ............... | G02B 6/0085 |
| | | | | 362/615 |
| 2012/0294041 A1* | 11/2012 | Huang | ................. | G02B 6/0085 |
| | | | | 362/613 |
| 2013/0063681 A1* | 3/2013 | Zhou | ................... | G02B 6/0088 |
| | | | | 362/606 |
| 2013/0093976 A1* | 4/2013 | Zhou | ....................... | F21V 17/00 |
| | | | | 349/58 |
| 2013/0155721 A1* | 6/2013 | Miyazaki | ............. | G02B 6/0088 |
| | | | | 362/611 |
| 2016/0377797 A1* | 12/2016 | Sundaram | ............... | G09G 3/36 |
| | | | | 345/102 |
| 2017/0139109 A1* | 5/2017 | Gierens | ................ | G02B 6/0043 |
| 2019/0204683 A1* | 7/2019 | Li | ............................ | G02B 6/00 |

FOREIGN PATENT DOCUMENTS

| | | |
|---|---|---|
| CN | 103727467 A | 4/2014 |
| CN | 204629254 U | 9/2015 |
| CN | 105093613 A | 11/2015 |
| CN | 205301764 U | 6/2016 |
| CN | 106842696 A | 6/2017 |
| CN | 107092136 A | 8/2017 |
| CN | 206710750 U | 12/2017 |
| CN | 207051612 U | 2/2018 |
| CN | 207114974 U | 3/2018 |
| CN | 208107825 U | 11/2018 |

* cited by examiner

BACKLIGHT SOURCE MODULE AND DISPLAY DEVICE

The present application claims the priority of the Chinese Patent Application No. 201820689511.2, filed on May 9, 2018, the entire disclosure of which is hereby incorporated as a part of the present application by reference.

TECHNICAL FIELD

Embodiments of the present disclosure relate to a backlight source module and a display device.

BACKGROUND

Requirements on full screen display of displays are increasing with the quick development of smartphones. In order to satisfy needs of consumers, displays with high brightness, ultra-thin frame, higher screen-to-body ratio and better visual experience are becoming the hotspot pursued by various mobile phone providers.

Backlight source module is an important element of the display, and the design requirements on the backlight source module are higher and higher. Currently, the design of the backlight source module with thin frame and high brightness is quite difficult.

SUMMARY

According to embodiments of the present disclosure, a backlight source module is provided. The backlight source module comprises a back plate structure and a rubber member. The back plate structure comprises: a bottom plate, and a first side plate and a second side plate respectively connected with the bottom plate, and the first side plate and the second side plate oppose each other; and a light-emitting portion, a light-guiding component and the rubber member are sequentially disposed on the bottom plate along a first direction pointing from the first side plate to the second side plate, and the rubber member is only disposed at the second side plate.

For example, the back plate structure further comprises a top plate, one end of the top plate is fixedly connected with a top edge of the first side plate, and the other end of the top plate extends along the first direction; an upper surface of the top plate is flush with an upper surface of the rubber member, and the top plate has an opening disposed above the light-emitting portion and the light-guiding component.

For example, the backlight source module further comprises: a heat-conducting component, disposed between the light-emitting portion and the bottom plate.

For example, a sunken trench is disposed at a portion, close to the first side plate, of the bottom plate; the light-emitting portion and the heat-conducting component are both disposed at the sunken trench, and a sum of a thickness of the light-emitting portion and a thickness of the heat-conducting component is equal to a vertical distance between a bottom of the sunken trench and the top plate.

For example, the light-emitting portion comprises a circuit board and a light source sequentially disposed on the heat-conducting component; a sum of a thickness of the circuit board and a thickness of the heat-conducting component is equal to a depth of the sunken trench; and a thickness of the light source is equal to a vertical distance between a portion, outside the sunken trench, of the bottom plate and the top plate.

For example, the light-guiding component comprises a reflective sheet, a light-guiding plate, and a set of optical films that are sequentially stacked; and the light-guiding plate is joggled with the rubber member, or the set of optical films is joggled with the rubber member, or the light-guiding plate and the set of optical films are both joggled with the rubber member.

For example, the light-guiding plate and the set of optical films are disposed with at least one lug protruding along the first direction; an avoidance trench is disposed at at least one end of the rubber member in a direction perpendicular to the first direction; and each of the at least one lug is joggled with one avoidance trench.

For example, a cross section of the avoidance trench parallel to the bottom plate presents a trapezoid, and a lower base of the trapezoid is closer to the second side plate than an upper base of the trapezoid.

For example, the back plate structure further comprises a third side plate and a fourth side plate opposing each other, the bottom plate is connected with the first side plate, the second side plate, the third side plate and the fourth side plate to obtain a cover-less cuboid box; the backlight source module comprises two avoidance trenches respectively located at two ends of the rubber member in the direction perpendicular to the first direction; and a distance between one of the two avoidance trenches and a center point is not equal to a distance between the other of the two avoidance trenches and the center point, and the center point is a center point of a vertical connection line between the third side plate and the fourth side plate; or a shape of a cross section of one of the two avoidance trenches parallel to the bottom plate is different from a shape of a cross section of the other of the two avoidance trenches parallel to the bottom plate; or the distance between one of the two avoidance trenches and the center point is not equal to the distance between the other of the two avoidance trenches and the center point, and the shape of the cross section of one of the two avoidance trenches parallel to the bottom plate is different from the shape of the cross section of the other of the two avoidance trenches parallel to the bottom plate.

For example, at one end of the rubber member in the direction perpendicular to the first direction, the avoidance trench is defined by the rubber member, the second side plate, and the third side plate; and at the other end of the rubber member in the direction perpendicular to the first direction, the avoidance trench is defined by the rubber member, the second side plate, and the fourth side plate.

For example, the light-guiding component comprises a reflective sheet, a light-guiding plate and a set of optical films that are sequentially stacked; a sum of a thickness of the reflective sheet and a thickness of the light-guiding plate is equal to a vertical distance between the portion, outside the sunken trench, of the bottom plate and the top plate; an upper surface of the light-guiding plate is flush with an upper surface of the light source, and a lower surface of the reflective sheet is flush with a lower surface of the light source.

For example, the backlight source module further comprises a position limiter; one end of the position limiter is located on the light source, and the other end of the position limiter is located on the light-guiding plate; and an upper surface of the position limiter is flush with an upper surface of the top plate or is slightly lower than the upper surface of the top plate.

For example, a material of the position limiter is a black light-absorbing material.

For example, the backlight source module further comprises: a light-shielding sheet; one end of the light-shielding sheet is connected with an upper surface of the top plate, and the other end of the light-shielding sheet is connected with the upper surface of the rubber member; and the light-shielding sheet is disposed with a light-transmitting region above the light-guiding component.

For example, the backlight source module further comprises: a first light-shielding sheet and a second light-shielding sheet. One end of the first light-shielding sheet is connected with an upper surface of the top plate, and the other end of the first light-shielding sheet covers a part of the light-guiding component; one end of the second light-shielding sheet is connected with the upper surface of the rubber member, and the other end of the second light-shielding sheet covers a part of the light-guiding component; and a region between the first light-shielding sheet and the second light-shielding sheet is a light-transmitting region, and the first light-shielding sheet is flush with the second light-shielding sheet.

For example, the rubber member closely attaches to the second side plate.

According to the embodiments of the present disclosure, a display device comprising the above-described backlight source module is provided.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Unless otherwise defined, the technical terms or scientific terms here should be of general meaning as understood by those ordinarily skilled in the art. In the descriptions and claims of the present disclosure, expressions such as "first", "second" and the like do not denote any order, quantity, or importance, but rather are used for distinguishing different components. Expressions such as "include" or "comprise" and the like denote that elements or objects appearing before the words of "include" or "comprise" cover the elements or the objects enumerated after the words of "include" or "comprise" or equivalents thereof, not exclusive of other elements or objects. Expressions such as "connect" or "interconnect" and the like are not limited to physical or mechanical connections, but may include electrical connections, whether direct or indirect. Expressions such as "up", "down", "left", "right" and the like are only used for expressing relative positional relationship, the relative positional relationship may be correspondingly changed in the case that the absolute position of a described object is changed.

A backlight source module comprises a back plate and a light-emitting portion. The back plate is required to have a relatively high flatness to ensure that the screen comprising the backlight source module has a relatively good display performance. In order that the backlight source module has a relatively narrow frame, the back plate for example is a mold frame having a rubber-iron-integrated structure, and the rubber-iron-integrated structure is a structure formed by applying a rubber to an iron member by an injection molding process. However, the difference between the shrinkage coefficient of the rubber and the shrinkage coefficient of the iron member is quite significant. The rubber is applied to the iron member by the injection molding process at a high temperature; at room temperature, the rubber contracts whereas the iron member substantially does not contract, the contraction of the rubber causes the iron member to warp relatively significantly, resulting in that the back plate is unqualified due to such significant warpage, and thus the yield of the product is decreased and the manufacture cost is increased. Therefore, the backlight source module has the defect of being prone to warpage.

The inventor of the present disclosure has considered that, if the amount of the rubber used in the back plate is reduced as much as possible and the spatial position of the rubber in the back plate is optimized, then the impact of the contraction of the rubber on the iron member can be reduced, and in turn the warpage degree of the iron member can be reduced and the yield of the product can be increased.

Figure 1:
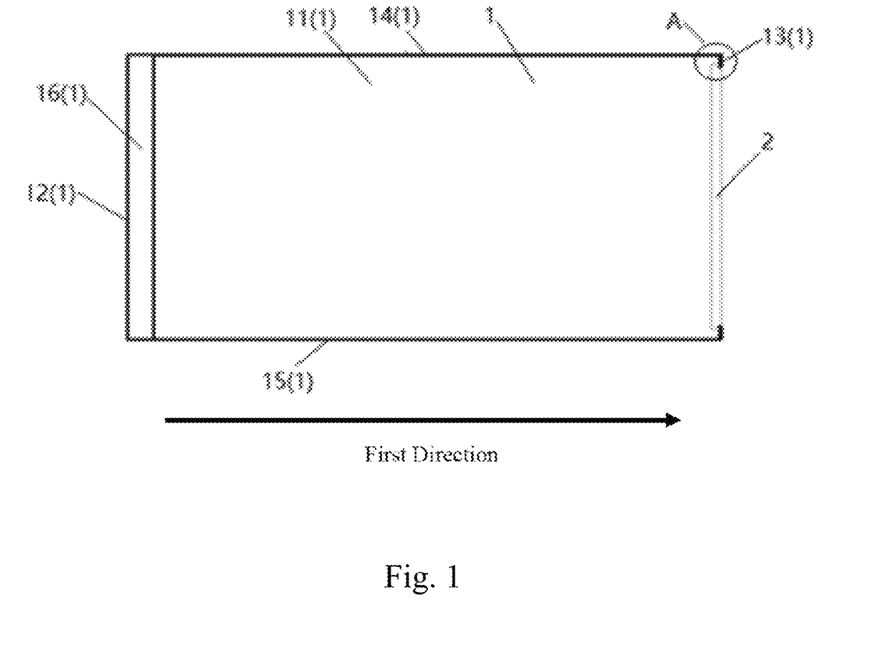
FIG. 1 is a schematic view illustrating that a back plate structure and a rubber member are assembled together provided by embodiments of the present disclosure.

Based on the above considerations, a backlight source module is provided by embodiments of the present disclosure, and the backlight source module comprises a back plate structure 1 and a rubber member 2. FIG. 1 is a schematic view illustrating that the back plate structure and the rubber member are assembled together provided by the embodiments of the present disclosure. As shown in FIG. 1, the back plate structure 1 comprises: a bottom plate 11, a first side plate 12 to a fourth side plate 15, and a top plate 16; the bottom plate 11 are connected with the first side plate 12 to the fourth side plate 15 to form a cover-less cuboid box. By way of example, a material of the bottom plate 11, the first side plate 12 to the fourth side plate 15, and the top plate 16 is a metal material, such as iron, and does not contain any rubber material.

Figure 2:
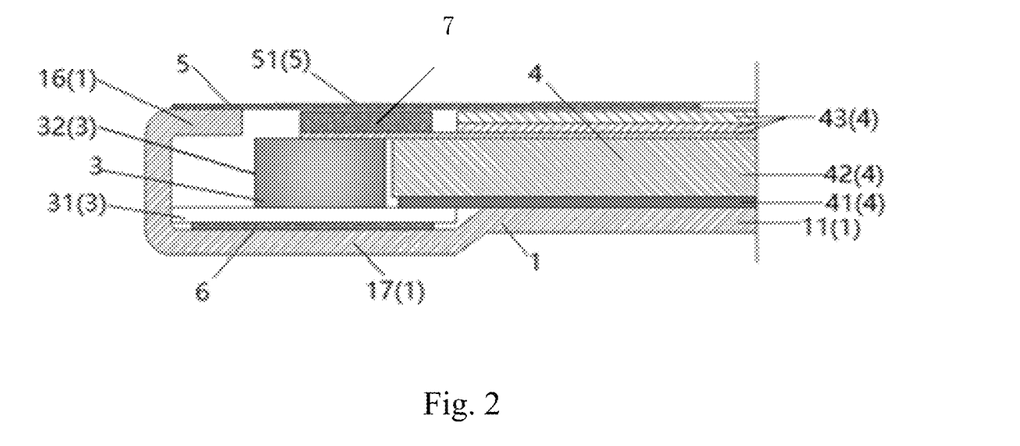
FIG. 2 is a section view of a side, close to a light-emitting portion, of a backlight source module provided by the embodiments of the present disclosure.
Figure 3:
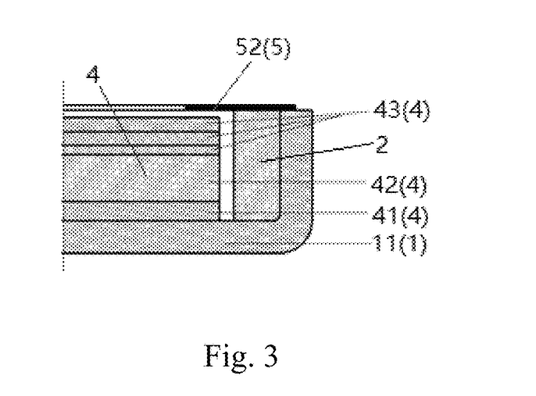
FIG. 3 is a section view of a side, close to the rubber member, of the backlight source module provided by the embodiments of the present disclosure

As shown in FIG. 2 and FIG. 3, a light-emitting portion 3, a light-guiding component 4 and the rubber member 2 are sequentially disposed on the bottom plate 11 along a first direction pointing from the first side plate 12 to the second side plate 13 opposing the first side plate 12; the rubber member 2 closely attaches to the second side plate 13. FIG. 2 is a section view of a side, close to the light-emitting portion, of the backlight source module provided by the embodiments of the present disclosure. FIG. 3 is a section view of a side, close to the rubber member, of the backlight source module provided by the embodiments of the present disclosure. Cross sections of FIG. 2 and FIG. 3 are planes perpendicular to an inner surface of the bottom plate 11 and extending parallel to the first direction. One end of the top plate 16 is fixedly connected with a top edge of the first side plate 12, the other end of the top plate 16 extends along the first direction; an upper surface of the top plate 16 is flush with an upper surface of the rubber member 2. By way of example, the top plate 16 is disposed with an opening above the light-emitting portion 3 and the light-guiding component 4.

In the backlight source module according to the embodiments of the present disclosure, the rubber member 2 is only disposed at the second side plate 13 of the back plate structure 1 but does not disposed at the bottom plate 11, the first side plate 12, the third side plate 14 and the fourth side plate 15 of the back plate structure 1, which greatly reduces the amount of the rubber member 2, and thus the warpage degree of the back plate structure 1 during the contraction of the rubber member 2 is reduced and the yield of the product is increased.

Further, the rubber member 2 closely attaches to the second side plate 13. During the rubber member 2 contracts, a contraction force imposed on the second side plate 13 to cause a deformation of the second side plate 13 is approximately perpendicular to the third side plate 14 and the fourth side plate 15. The third side plate 14 and the fourth side plate 15 are respectively connected with two ends of the second side plate 13, and thus the third side plate 14 and the fourth side plate 15 bear a part of the contraction force imposed on the second side plate 13 so that the deformation of the second side plate 13 is reduced, thereby the warpage degree of the back plate structure 1 is further reduced.

Furthermore, the light-emitting portion 3 is close to the first side plate 12, the rubber member 2 closely attaches to the second side plate 13, and thus a distance between the light-emitting portion 3 and the rubber member 2 is relatively far. During the operation of the backlight source module, the heat generated by the light-emitting portion 3 has little impact on the rubber member 2, which in turn reduces the degree of the volume expansion of the rubber member 2 caused by heat, and thus a case that a relatively large warpage of the back plate structure 1 is caused due to the volume expansion of the rubber member 2 is avoided. Meanwhile, the heat dispassion is facilitated by disposing the light-emitting portion 3 far away from the rubber member 2.

By way of example, the backlight source module according to the embodiments of the present disclosure further comprises a light-shielding sheet 5. The top plate 16 and the rubber member 2 horizontally support the light-shielding sheet 5. For example, one end of the light-shielding sheet 5 is adhered to and connected with the upper surface of the top plate 16, and the other end of the light-shielding sheet 5 is adhered to and connected with the upper surface of the rubber member 2. The light-shielding sheet 5 is disposed with a light-transmitting region above the light-guiding component 4.

For example, the light-shielding sheet 5 according to the embodiments of the present disclosure comprises a first light-shielding sheet 51 and a second light-shielding sheet 52. One end of the first light-shielding sheet 51 is adhered to and connected with the upper surface of the top plate 16, the other end of the first light-shielding sheet 51 covers a part of the light-guiding component 4. One end of the second light-shielding sheet 52 is adhered to and connected with the upper surface of the rubber member 2, and the other end of the second light-shielding sheet 52 covers a part of the light-guiding component 4. A region between the first light-shielding sheet 51 and the second light-shielding sheet 52 is the light-transmitting region, and the first light-shielding sheet 51 is flush with the second light-shielding sheet 52.

Generally, a brightness of the backlight source module is increased by increasing a light-emitting power of the light-emitting portion, but the higher light-emitting power causes a temperature rise of the light-emitting portion. In existing backlight source module, the light-emitting portion is fixed on the mold frame having the rubber-iron-integrated structure, and the mold frame having the rubber-iron-integrated structure is poor in heat dispassion so that the light-emitting portion cannot have the higher light-emitting power for the purpose of preventing heat accumulation, which in turn limits the increase of the brightness of the backlight source module.

To address the above issue, for example, the backlight source module according to the embodiments of the present disclosure further comprises a heat-conducting component 6 disposed between the light-emitting portion 3 and the bottom plate 11. The light-emitting portion 3 is connected with the bottom plate 11 via the heat-conducting component 6. The heat generated by the light-emitting portion 3 dissipates from the bottom plate 11 to the outside via the heat-conducting component 6, and thus the efficiency of heat dispassion is increased. Thus, the light-emitting portion 3 is possible to have the higher light-emitting power to increase the brightness of the backlight source module.

For example, the heat-conducting component 6 is a double-sided tape or other tapes having heat conductivity. Because the tape is relatively thin, the heat is quickly transferred to the bottom plate 11 so that the heat is quickly dissipated.

Figure 4:
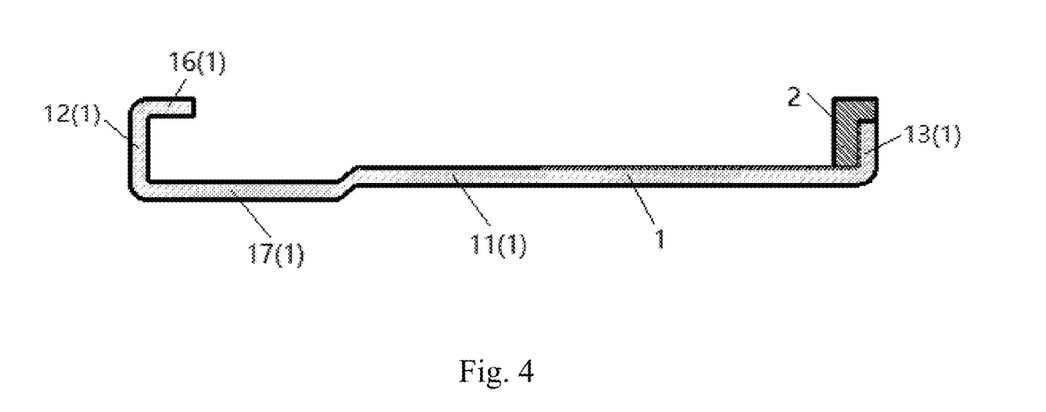
FIG. 4 and FIG. 5 are both section views illustrating that the back plate structure and the rubber member are assembled together provided by the embodiments of the present disclosure.
Figure 5:
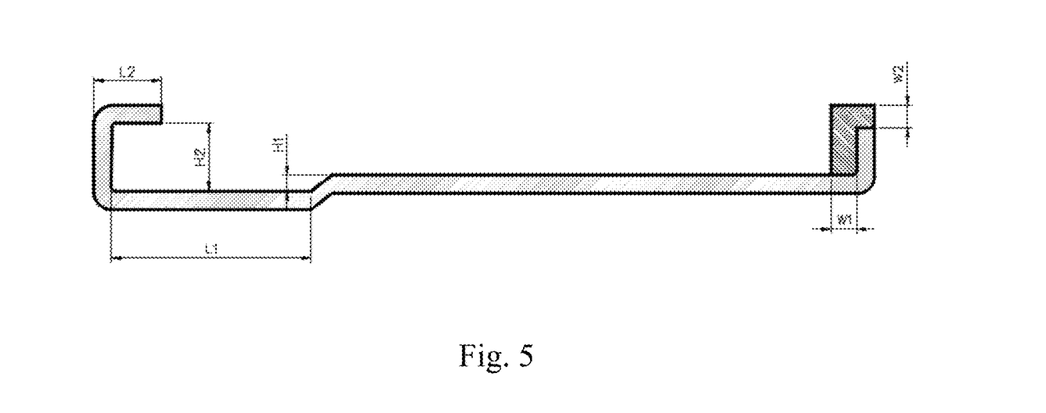

FIG. 4 and FIG. 5 are both section views illustrating that the back plate structure 1 and the rubber member 2 are assembled together provided by the embodiments of the present disclosure. The cross sections of FIG. 4 and FIG. 5 are planes perpendicular the inner surface of the bottom plate 11 and parallel to the first direction. For example, as shown in FIG. 2 and FIG. 4, in the embodiments of the present disclosure, a sunken trench 17 is disposed at a portion, close to the first side plate 12, of the bottom plate 11; the light-emitting portion 3 and the heat-conducting component 6 are both disposed at the sunken trench 17. A sum of a thickness of the light-emitting portion 3 and a thickness of the heat-conducting component 6 is equal to a vertical distance between a bottom of the sunken trench 17 and the top plate 16. It should be understood that a lower surface of the heat-conducting component 6 closely attaches to the bottom of the sunken trench 17, and an upper surface of the light-emitting portion 3 is flush with a lower surface of the top plate 16.

For example, the light-emitting portion 3 according to the embodiments of the present disclosure comprises a circuit board such as a flexible printed circuit (FPC) board 31 and a light source 32 sequentially disposed on the heat-conducting component 6. For example, the light source 32 is a light bar electrically connected with one side of the flexible printed circuit board 31. The other side of the flexible printed circuit board 31 is adhered to the heat-conducting component 6.

A sum of a thickness of the flexible printed circuit board 31 and a thickness of the heat-conducting component 6 is equal to a depth of the sunken trench 17. A thickness of the light source 32 is equal to a vertical distance between a portion, outside the sunken trench 17, of the bottom plate 11 and the top plate 16. It should be understood as that the lower surface of the heat-conducting component 6 closely attaches to the bottom of the sunken trench 17, the upper surface of the light source 32 is flush with the lower surface of the top plate 16, and a lower surface of the light source 32 is flush with an inner surface of the portion, outside the sunken trench 17, of the bottom plate 11. In this case, light emitted by the light source 32 is not obstructed by a sidewall of the sunken trench 17, thereby the light utilization of the light source 32 is increased.

For example, the light-guiding component 4 according to the embodiments of the present disclosure comprises a reflective sheet 41, a light-guiding plate 42, and a set of optical films 43 which are sequentially stacked. A sum of a thickness of the reflective sheet 41 and a thickness of the light-guiding plate 42 is equal to a vertical distance between the portion, outside the sunken trench 17, of the bottom plate 11 and the top plate 16. Further, an upper surface of the light-guiding plate 42 is flush with the upper surface of the light source 32, and a lower surface of the reflective sheet 41 is flush with a lower surface of the light source 32. In this case, a range of the light emitted by the light source 32 exactly covers the reflective sheet 41 and the light-guiding plate 42, which ensures that the light emitted by the light source 32 all is directed towards the reflective sheet 41 and the light-guiding plate 42 so that the light utilization of the light source 32 is further improved.

For example, in the embodiments of the present disclosure, as shown in FIG. 5, the depth of the sunken trench 17 is H1, and a range of H1 for example is 0.09 mm≤H1≤0.117 mm; the vertical distance between the bottom of the sunken trench 17 and the top plate 16 is H2, and a range of H2 for example is 0.35 mm≤H2≤0.7 mm; a length of the sunken trench 17 along the first direction is L1, and a range of L1 for example is 0.55 mm≤L1≤3.8 mm; a length of the top plate 16 extending along the first direction is L2, and a range of L2 for example is 0.3 mm≤L2≤0.65 mm. The rubber member 2 closely attaches to an inner surface of the second side plate 13. A distance between a side, closest to the light-guiding component 4, of the rubber member 2 and the inner surface of the second side plate 13 is W1, a range of W1 is for example W1≥0.2 mm. A top portion of the rubber member 2 for example extends along the first direction to cover an upper surface of the second side plate 13. A thickness of the top portion, covering the upper surface of the second side plate 13, of the rubber member 2 is W2, and a range of W2 for example is W2≥0.2 mm. It should be noted that the above numerical ranges are merely examples of the embodiments of the present disclosure, which are not limited in the present disclosure.

In order that the backlight source module has a relatively narrow frame, the back plate structure is required to be simplified. For example, the narrow frame of the backlight source module is achieved by decreasing fixture elements of the back plate structure; however, the backlight source module employing such back plate structure is poor in fixing the light-guiding plate and the optical films, and the light-guiding plate and the optical films easily displace during vibration or tumbling test, resulting in the unqualified product.

For example, in order to improve the stability of the backlight source module, the light-guiding component 4 is connected with the rubber member 2 to prevent the displacement of the light-guiding component 4 in the embodiments of the present disclosure. The light-guiding component 4 comprises the reflective sheet 41, the light-guiding plate 42, and the set of optical films 43 that are sequentially stacked. The light-guiding component 4 and the rubber member 2 are connected with each other in the following manner: the light-guiding plate 42 is joggled with the rubber member 2; or, the set of optical films 43 is joggled with the rubber member 2; or, the light-guiding plate 42 and the set of optical films 43 both are joggled with the rubber member 2.

To facilitate the understanding, in the embodiments of the present disclosure, a plane in which the inner surface of the bottom plate 11 is provided is defined as the horizontal plane, a direction perpendicular to the horizontal plane is defined as the vertical direction. The light-guiding component 4 is connected with the rubber member 2 to prevent the light-guiding component 4 from displacing in any direction. Because the reflective sheet 41, the light-guiding plate 42 and the set of optical films 43 are attached and connected together, the purpose of connecting an entirety of the light-guiding component 4 with the rubber member 2 to prevent the light-guiding component 4 from displacing is achieved whether the light-guiding plate 42 is joggled with the rubber member 2 or the set of optical films 43 is joggled with the rubber member 2. In the embodiments of the present disclosure, in order to better ensure the connection strength between the light-guiding component 4 and the rubber member 2, both the light-guiding plate 42 and the set of optical films 43 are joggled with the rubber member 2.

Figure 6:
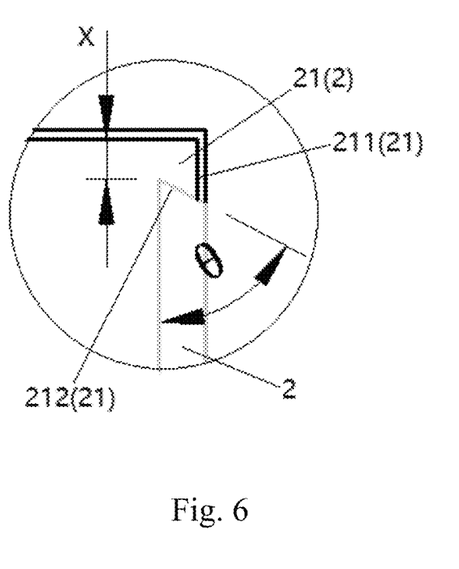
FIG. 6 is a partial enlarged view at a portion "A" in FIG. 1 after the back plate structure and the rubber member are assembled provided by the embodiments of the present disclosure.
Figure 7:
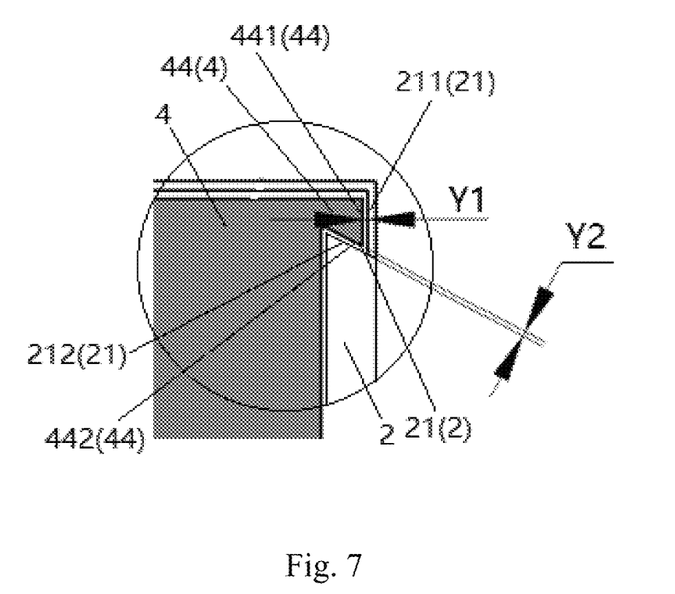
FIG. 7 is a partial enlarged view at the portion "A" in FIG. 1 of the backlight source module without a light-shielding sheet provided by the embodiments of the present disclosure.

FIG. 6 is a partial enlarged view at a portion "A" in FIG. 1 after the back plate structure 1 and the rubber member 2 are assembled together provided by the embodiments of the present disclosure. FIG. 7 is a partial enlarged view at the portion "A" in FIG. 1 of the backlight source module without the light-shielding sheet 5 provided by the embodiments of the present disclosure.

For example, as shown in FIG. 6 and FIG. 7 in conjunction with FIG. 1, the light-guiding plate 42 and the set of optical films 43 are both disposed with at least one lug 44 protruding along the first direction; an avoidance trench 21 is disposed at at least one end of the rubber member 2 in a direction perpendicular to first direction; and each of the lugs 44 is joggled with one avoidance trench 21.

The shape of the avoidance trench 21 is not specifically defined, as long as it is ensured that the light-guiding component 4 does not displace after the lug 44 is joggled with the avoidance trench 21. For example, an edge, defined by the rubber member 12, of the cross section of the avoidance trench 21 parallel to bottom plate 11 is a straight line or an arc intersecting with the first direction.

For example, in the embodiments of the present disclosure, the cross section of the avoidance trench 21 parallel to bottom plate 11 presents a trapezoid; a lower base of the trapezoid is closer to the second side plate 13 than an upper base of the trapezoid. It can be contemplated that the lug 44 is a column having a trapezoid cross section perpendicular to an axial direction of the column (i.e. the trapezoid cross section of the column is parallel to the bottom plate 11), and a side surface, in which an upper base of the trapezoid is provided, of the column is connected with the light-guiding component 4.

In order to achieve the joggling connection of the lug 44 and the avoidance trench 21, a top, facing away from the bottom plate 11, of the avoidance trench 21 has a top open, and a region, facing the light-guiding component 4, of the avoidance trench 21 has a side open. The lug 44 enters into the avoidance trench 21 along the vertical direction and via the top open and the side open. A width, perpendicular to the first direction, of a connection portion of the lug 44 and the light-guiding component 4 fits a width, perpendicular to the first direction, of the side open, whereas widths, perpendicular to the first direction, of other portions of the lug 44 are all larger than the width, perpendicular to the first direction, of the side open. Thus, in a direction parallel to the bottom plate 11, the lug 44 cannot enter or exit the avoidance trench 21 via the side open so that the displacement of the light-guiding component 4 in the direction parallel to bottom plate 11 is avoided.

For example, in the embodiments of the present disclosure, the avoidance trench 21 is disposed close to a connection portion of the second side plate 13 and the third side plate 14, or is disposed to a connection portion of the second side plate 13 and the fourth side plate 15. The cross section of the avoidance trench 21 parallel to bottom plate 11 presents a right-angled trapezoid, in which the lower base of the right-angled trapezoid is defined by the inner surface of the second side plate 13, a right-angled waist, perpendicular to the lower base, of the right-angled trapezoid is an inner surface of the third side plate 14 or an inner surface of the fourth side plate 15; in this case, it can be contemplated that the lug 44 is the column having the right-angled trapezoid cross section perpendicular to the axial direction of the column (i.e. the right-angled trapezoid cross section of the column is parallel to the bottom plate 11).

The avoidance trench 21 is defined by the rubber member 2, the second side plate 13, and the third side plate 14; or the avoidance trench 21 is defined by the rubber member 2, the second side plate 13, and the fourth side plate 15. Thus, it is not necessary to form the avoidance trench 21 within a body of the rubber member 2. On one hand, the strength of the rubber member 2 itself is ensured; and on the other hand, a length of the rubber member 2 to be attached to the second side plate 13 is reduced, which in turn reduces the deformation degree of the second side plate 13 caused by the contraction of the rubber member 2.

In order to facilitate the joggling connection of the lug 44 and the avoidance trench 21, for example, the lug 44 and the avoidance trench 21 are clearance-fitted. That is, the lug 44 and the avoidance trench 21 are joggled with each other and spaced from each other. A fitting precision of the lug 44 and the avoidance trench 21 should satisfy certain requirements. In order to facilitate the understanding, for the avoidance trench 21, a side surface in which the lower base of the right-angled trapezoid cross section of the avoidance trench 21 is provided is defined as a first lower bottom surface 211, and a side surface in which a slant waist of the right-angled trapezoid cross section of the avoidance trench 21 is provided is defined as a first slant waist surface 212; for the lug 44, a side surface in which the lower base of the right-angled trapezoid cross section of the lug 44 is provided is defined as a second lower bottom surface 441, and a side in which a slant waist of the right-angled trapezoid cross section of the lug 44 is provided is defined as a second slant waist surface 442. A gap between the first lower bottom surface 211 and the second lower bottom surface 441 is Y1, a gap between the first slant waist surface 212 and the second slant waist surface 442 is Y2. In the embodiments of the present disclosure, a range of Y1 for example is 0.05 mm≤Y1≤0.2 mm, and a range of Y2 for example is 0.05 mm≤Y2≤0.2 mm; an angle between the first lower bottom surface 211 and the first slant waist surface 212 is θ, a range of θ for example is 30°≤θ≤60° C.; the width, perpendicular to the first direction, of the side open is X, a range of X for example is 0.5 mm≤X≤5 mm. It should be noted that the above numerical ranges are merely examples of the embodiments of the present disclosure, which are not limited in the present disclosure.

For example, in the embodiments of the present disclosure, the avoidance trench 21 is disposed at both ends of the rubber member 2 in the direction perpendicular to first direction. That is, the backlight source module comprises two avoidance trenches 21, and accordingly, the light-guiding component 4 comprises two lugs 44, each of the lugs 44 corresponds to one of the two avoidance trenches 21. The connection stability of the backlight source module is improved by disposing two avoidance trenches 21.

For example, in the case that two avoidance trenches 21 and two lugs 44 are disposed, the embodiments of the present disclosure employ the following manner to achieve fool-proof to avoid the light-guiding component 4 from being installed inversely:

a distance between one of the two avoidance trenches 21 and a center point is not equal to a distance between the other of the two avoidance trenches 21 and the center point, the center point being a center point of a vertical connection line between the third side plate 14 and the fourth side plate 15; or a shape of a cross section of one of the two avoidance trenches 21 parallel to the bottom plate 11 is different from a shape of a cross section of the other of the two avoidance trenches 21 parallel to the bottom plate 11; or the distance between one of the two avoidance trenches 21 and the center point is not equal to the distance between the other of the two avoidance trenches 21 and the center point, and the shape of the cross section of one of the two avoidance trenches 21 parallel to the bottom plate 11 is different from the shape of the cross section of the other of the two avoidance trenches 21 parallel to the bottom plate 11.

It should be noted that "the shape of the cross section of one of the two avoidance trenches 21 parallel to the bottom plate 11 being different from the shape of the cross section of the other of the two avoidance trenches 21 parallel to the bottom plate 11" comprises a difference in size or a difference in profile. For example, the shape of the cross section of one of the two avoidance trenches 21 parallel to the bottom plate 11 and the shape of the cross section of the other of the two avoidance trenches 21 parallel to the bottom plate 11 are both the right-angled trapezoid, but a length of the lower base of the right-angled trapezoid cross section of one of the two avoidance trenches 21 is different from a length of the lower base of the right-angled trapezoid cross section of the other of the two avoidance trenches 21. Alternatively, the shape of the cross section of one of the two avoidance trenches 21 parallel to the bottom plate 11 is the right-angled trapezoid, and the shape of the cross section of the other of the two avoidance trenches 21 parallel to the bottom plate 11 is a isosceles trapezoid.

In the above manner of fool-proof, during the light-guiding component 4 is connected with the rubber member 2, one lug 44 is only able to be joggled with one of the avoidance trenches 21, and cannot be joggled with the other of the avoidance trenches 21, thereby achieving the purpose of fool-proof.

For example, as shown in FIG. 2, the backlight source module further comprises a position limiter 7 having one end located on the light source 6 and the other end located on the light-guiding plate 42. An upper surface of the position limiter 7 is flush with an upper surface of the top plate 16, or is slightly lower than the upper surface of the top plate 16. At least a part of the set of optical films 43 may deform upon being heated, and thus an end of the at least a part of the set of optical films 43 and a light incidence surface of the light-guiding plate 42 are spaced apart from each with a certain distance. The installation of the at least a part of the set of optical films 43 is facilitated by disposing the position limiter 7. For example, a material of the position limiter 7 is a black light-absorbing material. Thus, in addition to limit the position of the at least a part of the set of optical films 43, the position limiter 7 also absorbs a portion of light emitted from the light source 32 but not entering the light-guiding plate 42, thereby preventing light leakage and improving display performance.

A display device is also provided by the embodiments of the present disclosure, and the display device comprises the backlight source module provided by the embodiments of the present disclosure. For example, the display device is a liquid crystal television, a cellphone, a tablet computer or any device with a display function.

The embodiments of the present disclosure at least have the following advantages:

1. In the backlight source module according to the embodiments of the present disclosure, the rubber member is only disposed at the second side plate of the back plate structure, thereby greatly reducing the usage amount of the rubber member. The warpage of the back plate structure during the contraction of the rubber member is reduced, thereby improving the yield of the product.

Further, the rubber member closely attaches to the second side plate, the contraction force imposed on the second side plate to cause the deformation of the second side plate during the contraction of the rubber member is approximately perpendicular to the third side plate and the fourth side plate. The third side plate and the fourth side plate are respectively connected with two ends of the second side plate, and thus the third side plate and the fourth side plate bear a part of the contraction force imposed on the second side plate so that the deformation of the second side plate is reduced, thereby the warpage degree of the back plate structure is further reduced.

Furthermore, the light-emitting portion is close to the first side plate, the rubber member closely attaches to the second side plate, and thus a distance between the light-emitting portion and the rubber member is relatively far. During the operation of the backlight source module, the heat generated by the light-emitting portion has little impact on the rubber member, which in turn reduces the degree of the volume expansion of the rubber member caused by heat, and thus a case that a relatively large warpage of the back plate structure is caused due to the volume expansion of the rubber member is avoided. Meanwhile, the heat dispassion is facilitated by disposing the light-emitting portion far away from the rubber member.

2. The backlight source module according to the embodiments of the present disclosure further comprises the heat-conducting component disposed between the light-emitting portion and the bottom plate. The heat generated by the light-emitting portion dissipates from the bottom plate to the outside via the heat-conducting component, and thus the efficiency of heat dispassion is increased. Thus, the light-emitting portion is possible to have the higher light-emitting power to increase the brightness of the backlight source module. Furthermore, the heat-conducting component is the double-sided tape or other tapes having heat conductivity. Because the tape is relatively thin, the heat is quickly transferred to the bottom plate so that the heat is quickly dissipated.

3. The back plate is disposed with the sunken trench, the light-emitting portion and the heat-conducting component are both disposed at the sunken trench, the lower surface of the heat-conducting component closely attaches to the bottom of the sunken trench, the upper surface of the light source is flush with the lower surface of the top plate, the lower surface of the light source is flush with the inner surface of the portion, outside the sunken trench, of the bottom plate. In this case, the light emitted by the light source is not obstructed by the sidewall of the sunken trench, thereby improving the light utilization of the light source. Further, the sum of the thickness of the reflective sheet and the thickness of the light-guiding plate is equal to the vertical distance between the portion, outside the sunken trench, of the bottom plate and the top plate. Additionally, the upper surface of the light-guiding plate is flush with the upper surface of the light source, and the lower surface of the reflective sheet is flush with the lower surface of the light source. In this case, the range of the light emitted by the light source exactly covers the reflective sheet and the light-guiding plate, thereby ensuring that all light emitted by the light source is directed towards the reflective sheet and the light-guiding plate so that the light utilization of the light source is further improved.

4. The light-guiding component is joggled with the rubber member, thereby improving the stability of the backlight source module so that the displacement of the light-guiding component is avoided.

5. The avoidance trench is defined and enclosed by the rubber member, the second side plate, and the third side plate. Alternatively, the avoidance trench is defined and enclosed by the rubber member, the second side plate, and the fourth side plate. It is not necessary to form the avoidance trench within the body of the rubber member. On one hand, the strength of the rubber member itself is ensured, and on the other hand, the length of the rubber member to be attached to the second side plate is reduced, thereby reducing the deformation of the second side plate caused by the contraction of the rubber member.

6. Two avoidance trenches are disposed in the embodiments of the present disclosure, which improves the connection stability of the backlight source module, as well as achieve fool-proof to prevent the light-guiding component from being installed inversely.

The foregoing embodiments merely are exemplary embodiments of the disclosure, and not intended to define the scope of the disclosure, and the scope of the disclosure is determined by the appended claims.

What is claimed is:

1. A backlight source module, comprising: a back plate structure and a rubber member, wherein
the back plate structure comprises: a bottom plate, and a first side plate and a second side plate respectively connected with the bottom plate, and the first side plate and the second side plate oppose each other;
a light-emitting portion, a light-guiding component and the rubber member are sequentially disposed on the bottom plate along a first direction pointing from the first side plate to the second side plate, and the rubber member is only disposed at the second side plate;

the back plate structure further comprises a top plate, one end of the top plate is fixedly connected with a top edge of the first side plate, and the other end of the top plate extends along the first direction;

an upper surface of the top Plate is flush with an upper surface of the rubber member, and the too plate has an opening disposed above the light-emitting portion and the light-guiding component;

the backlight source module further comprises: a heat-conducting component, disposed between the light-emitting portion and the bottom plate;

a sunken trench is disposed at a portion, close to the first side plate, of the bottom plate; and the light-emitting portion and the heat-conducting component are both disposed at the sunken trench, and a sum of a thickness of the light-emitting portion and a thickness of the heat-conducting component is equal to a vertical distance between a bottom of the sunken trench and the top plate.

2. The backlight source module according to claim 1, wherein
the light-emitting portion comprises a circuit board and a light source sequentially disposed on the heat-conducting component;
a sum of a thickness of the circuit board and a thickness of the heat-conducting component is equal to a depth of the sunken trench; and
a thickness of the light source is equal to a vertical distance between a portion, outside the sunken trench, of the bottom plate and the top plate.

3. The backlight source module according to claim 2, wherein
the light-guiding component comprises a reflective sheet, a light-guiding plate and a set of optical films that are sequentially stacked;
a sum of a thickness of the reflective sheet and a thickness of the light-guiding plate is equal to a vertical distance between the portion, outside the sunken trench, of the bottom plate and the top plate;
an upper surface of the light-guiding plate is flush with an upper surface of the light source, and a lower surface of the reflective sheet is flush with a lower surface of the light source.

4. The backlight source module according to claim 3, further comprising a position limiter, wherein
one end of the position limiter is located on the light source, and the other end of the position limiter is located on the light-guiding plate; and
an upper surface of the position limiter is flush with an upper surface of the top plate or is slightly lower than the upper surface of the top plate.

5. The backlight source module according to claim 4, wherein a material of the position limiter is a black light-absorbing material.

6. The backlight source module according to claim 1, wherein
the light-guiding component comprises a reflective sheet, a light-guiding plate, and a set of optical films that are sequentially stacked; and
the light-guiding plate is joggled with the rubber member, or the set of optical films is joggled with the rubber member, or the light-guiding plate and the set of optical films are both joggled with the rubber member.

7. The backlight source module according to claim 6, wherein the light-guiding plate and the set of optical films are disposed with at least one lug protruding along the first direction;
an avoidance trench is disposed at at least one end of the rubber member in a direction perpendicular to the first direction; and
each of the at least one lug is joggled with one avoidance trench.

8. The backlight source module according to claim 7, wherein
a cross section of the avoidance trench parallel to the bottom plate presents a trapezoid, and a lower base of the trapezoid is closer to the second side plate than an upper base of the trapezoid.

9. The backlight source module according to claim 7, wherein
the back plate structure further comprises a third side plate and a fourth side plate opposing each other, the bottom plate is connected with the first side plate, the second side plate, the third side plate and the fourth side plate to obtain a cover-less cuboid box;
the backlight source module comprises two avoidance trenches respectively located at two ends of the rubber member in the direction perpendicular to the first direction; and
a distance between one of the two avoidance trenches and a center point is not equal to a distance between the other of the two avoidance trenches and the center point, and the center point is a center point of a vertical connection line between the third side plate and the fourth side plate; or a shape of a cross section of one of the two avoidance trenches parallel to the bottom plate is different from a shape of a cross section of the other of the two avoidance trenches parallel to the bottom plate; or the distance between one of the two avoidance trenches and the center point is not equal to the distance between the other of the two avoidance trenches and the center point, and the shape of the cross section of one of the two avoidance trenches parallel to the bottom plate is different from the shape of the cross section of the other of the two avoidance trenches parallel to the bottom plate.

10. The backlight source module according to claim 9, wherein
at one end of the rubber member in the direction perpendicular to the first direction, the avoidance trench is defined by the rubber member, the second side plate, and the third side plate; and
at the other end of the rubber member in the direction perpendicular to the first direction, the avoidance trench is defined by the rubber member, the second side plate, and the fourth side plate.

11. The backlight source module according to claim 7, wherein the lug and the avoidance trench are joggled with each other and spaced from each other.

12. The backlight source module according to claim 1, further comprising: a light-shielding sheet, wherein
one end of the light-shielding sheet is connected with an upper surface of the top plate, and the other end of the light-shielding sheet is connected with the upper surface of the rubber member; and
the light-shielding sheet is disposed with a light-transmitting region above the light-guiding component.

13. The backlight source module according to claim 1, further comprising: a first light-shielding sheet and a second light-shielding sheet, wherein one end of the first light-shielding sheet is connected with an upper surface of the top plate, and the other end of the first light-shielding sheet covers a part of the light-guiding component;
one end of the second light-shielding sheet is connected with the upper surface of the rubber member, and the other end of the second light-shielding sheet covers a part of the light-guiding component; and
a region between the first light-shielding sheet and the second light-shielding sheet is a light-transmitting region, and the first light-shielding sheet is flush with the second light-shielding sheet.

14. The backlight source module according to claim 1, wherein the rubber member closely attaches to the second side plate.

15. A display device, comprising the backlight source module according to claim 1.

16. The backlight source module according to claim 1, wherein a top portion of the rubber member extends along the first direction to cover an upper surface of the second side plate.

17. A backlight source module, comprising: a back plate structure and a rubber member, wherein
the back plate structure comprises: a bottom plate, and a first side plate and a second side plate respectively connected with the bottom plate, and the first side plate and the second side plate oppose each other;
a light-emitting portion, a light-guiding component and the rubber member are sequentially disposed on the bottom plate along a first direction pointing from the first side plate to the second side plate, and the rubber member is only disposed at the second side plate;
the light-guiding component comprises a reflective sheet, a light-guiding plate, and a set of optical films that are sequentially stacked; and
the light-guiding plate is joggled with the rubber member, or the set of optical films is joggled with the rubber member, or the light-guiding plate and the set of optical films are both joggled with the rubber member.

18. The backlight source module according to claim 17, wherein
the light-guiding plate and the set of optical films are disposed with at least one lug protruding along the first direction;
an avoidance trench is disposed at at least one end of the rubber member in a direction perpendicular to the first direction; and
each of the at least one lug is joggled with one avoidance trench.

19. The backlight source module according to claim 18, wherein
a cross section of the avoidance trench parallel to the bottom plate presents a trapezoid, and a lower base of the trapezoid is closer to the second side plate than an upper base of the trapezoid.

20. The backlight source module according to claim 18, wherein
the back plate structure further comprises a third side plate and a fourth side plate opposing each other, the bottom plate is connected with the first side plate, the second side plate, the third side plate and the fourth side plate to obtain a cover-less cuboid box;
the backlight source module comprises two avoidance trenches respectively located at two ends of the rubber member in the direction perpendicular to the first direction; and
a distance between one of the two avoidance trenches and a center point is not equal to a distance between the other of the two avoidance trenches and the center point, and the center point is a center point of a vertical connection line between the third side plate and the fourth side plate; or a shape of a cross section of one of the two avoidance trenches parallel to the bottom plate is different from a shape of a cross section of the other of the two avoidance trenches parallel to the bottom plate; or the distance between one of the two avoidance trenches and the center point is not equal to the distance between the other of the two avoidance trenches and the center point, and the shape of the cross section of one of the two avoidance trenches parallel to the bottom plate is different from the shape of the cross section of the other of the two avoidance trenches parallel to the bottom plate.

\* \* \* \* \*